Figure 1:
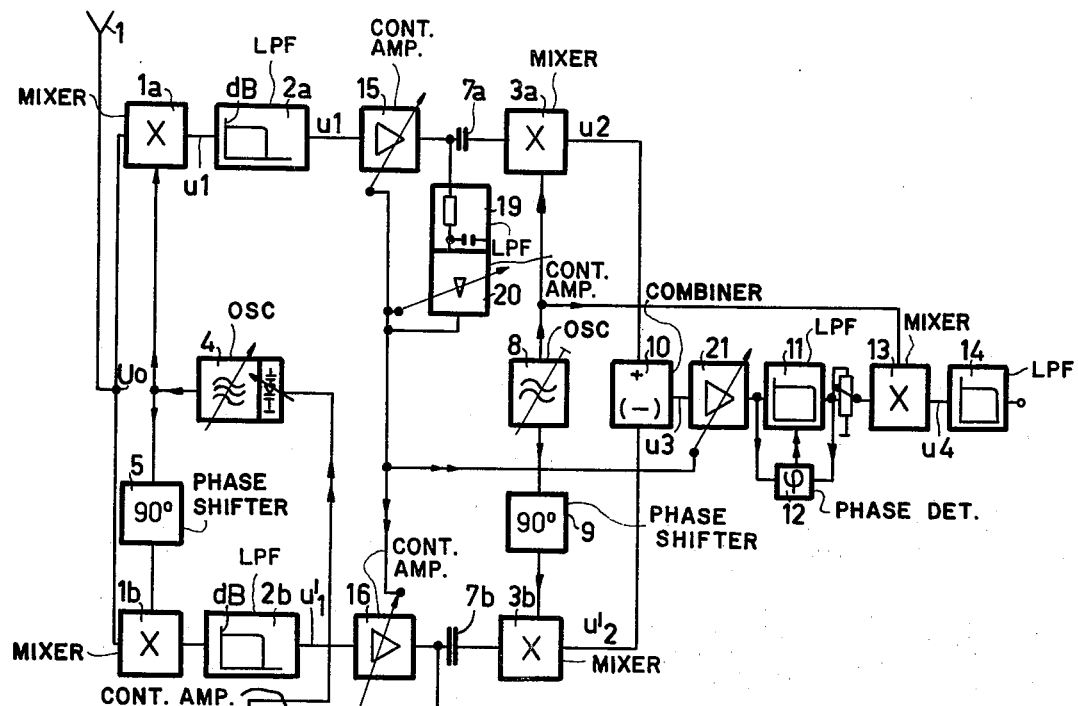

United States Patent [19]

Berger

[11] 4,193,035

[45] Mar. 11, 1980

[54] CIRCUIT ARRANGEMENT FOR RECEIVING ONE OF THE SIDEBANDS FROM A DOUBLE SIDEBAND SIGNAL

[75] Inventor: Hermann Berger, Hamburg, Fed. Rep. of Germany

[73] Assignee: U.S. Philips Corporation, New York, N.Y.

[21] Appl. No.: 852,362

[22] Filed: Nov. 17, 1977

[30] Foreign Application Priority Data

Dec. 17, 1976 [DE] Fed. Rep. of Germany ....... 2657170

[51] Int. Cl.² .......................... H04B 1/16; H04B 1/68
[52] U.S. Cl. .................................................. 455/203
[58] Field of Search ............................... 325/330, 467

[56] References Cited

U.S. PATENT DOCUMENTS

| | | | |
|---|---|---|---|
| 3,611,144 | 10/1971 | Harmon | 325/330 |
| 3,969,675 | 7/1976 | Gosling | 325/330 |

*Primary Examiner*—Howard W. Britton
*Attorney, Agent, or Firm*—Thomas A. Briody; William J. Streeter; Edward W. Goodman

[57] ABSTRACT

The invention relates to an AM-receiver for receiving one of the sidebands of a double sideband signal, for example, in medium wave or short wave broadcast. Selective fading is avoided by the reception of one sideband only. The circuit can substantially be implemented from input to output in integrated circuit technology. It enables the high-grade reception of the double sideband AM-signals without crosstalk or squal.

13 Claims, 9 Drawing Figures

CIRCUIT ARRANGEMENT FOR RECEIVING ONE OF THE SIDEBANDS FROM A DOUBLE SIDEBAND SIGNAL

The invention relates to an electric circuit arrangement for receiving one of the sidebands of a double sideband signal, comprising two first mixing stages in which the double sideband signal is mixed with either one of two locally produced radio frequency oscillations which are shifted in phase over 90° relative to one another but are of the same frequency, the output signals of the two mixing stages being filtered by means of first and second low-pass filters, amplified and supplied to two second mixing stages in which they are each mixed with either one of two locally produced low-frequency oscillations shifted in phase over 90° relative to one another but which are of the same frequency, the output signals of the two second mixing stages being applied to an adder (sub-tractor) circuit.

Such a circuit arrangement is known—especially in connection with a receiver for single sideband signals (cf., for example, DT-AS No. 16 16 312 and "Proc. IRE 44" (1956) pages 1703 to 1705). The frequency of the locally produced radio frequency oscillation corresponds to the medium frequency of the received sideband and the frequency of the locally produced low-frequency oscillation corresponds to the medium frequency of the useful signal spectrum (third method). With this circuit there is the risk that the high frequency oscillation is radiated and will cause squeaking in adjacent receivers. The second mixing stages in which the low-pass-filtered output signal of the preceding mixing stages is mixed with the low frequency oscillation and which are, for example, constituted as balanced modulators, must be of a very symmetrical construction as otherwise a distortion is produced in the centre of the useful frequency band owing to mixing with the low frequency oscillation. External screening and symmetry measures are therefore required, which partially offset again the advantages of this circuit arrangement (i.a. the fact they can be easily integrated, as coils are no longer required).

However, the invention relates to a circuit arrangement for receiving double-sideband signals, particularly with a full or an attenuated carrier, which can be utilized for example in medium-wave of short-wave broadcasting.

The prior art circuits generally utilize a frequency conversion for producing an intermediate frequency and require band filters in the intermediate frequency range to suppress signals from adjacent channels. The known receiver circuits can therefore only be partially implemented in integrated circuit technology and the required filters must be connected externally. A further drawback of the known circuits consists in distortions when the so-called "selective fadings" occur. This effect, which is extremely annoying in radio reception, is produced by the fact that the carrier changes its amplitude or its phase position relative to the two sidebands. Consequently, a qualitatively satisfactory reception of the signals from remote medium-wave or short-wave transmitters is generally impossible. Also the reception of the image frequency and the risk of direct reception on the intermediate frequency as well as the occurrence of spurious beaks and squeaking in the receiving range are amongst the unpleasant properties of these circuits.

It is an object of the present invention to provide a circuit arrangement which enables the first-grade reception of double-sideband AM-signals, also from remote transmitters, and which can be implemented in a simple manner in integrated circuit technology and which shows no spurious beaks and squeaking.

Starting from a circuit arrangement of the type mentioned in the preamble this object is accomplished by the following features:

(a) the frequency of the local radio-frequency oscillation corresponds to the carrier frequency of the double-side-band signal, (b) the frequency of the local low-frequency oscillation exceeds or is equal to the upper frequency of the LF useful signal to be transmitted, (c) The adder (subtractor) circuit is followed by a third low-pass filter which suppresses signals having a frequency equal to or above the frequency of the local low frequency oscillation, (d) the output signals of the third low-pass filter are mixed in a last mixing stage with the low-frequency oscillation.

An elaboration of the invention provides that the last mixing stage is followed by a fourth low-pass filter whose cutoff frequency corresponds to that of the third low-pass filter. By mixing the output signals of the third low-pass filter, with the low frequency oscillation in the last mixing stage, two sidebands are produced, only one of which (the lower one) can be used. It is true that the frequency of the low-frequency oscillation can be chosen so that the upper band of these two sidebands is outside the useful frequency range or outside the audio frequency range respectively, but the requirements imposed on the third low-pass filter and which separates the two sidebands of the double-sideband signal would be much higher.

A further elaboration of the invention ensures that, for the reception of double-sideband signals with carriers, the radio frequency oscillation is supplied by a tunable oscillatory circuit, whose frequency is synchronized by means of a phase and/or frequency control circuit with the instantaneous carrier frequency. A so-called PLL-circuit (Phase Locked Loop), which compares the frequency of the oscillator signal with the frequency of the carrier, comprised in the input signal, and which so changes the oscillator frequency that the difference of the phase position between receiver carrier and the locally produced oscillation is brough to a minimum, can be used as phase or frequency control circuit. This also requires a low-pass filter having a very small or switcheable cutoff frequency and a variable control voltage amplifier.

With the circuit arrangement according to the invention only one of the two sidebands comprised in the double-sideband signal is always used for reception. So a change in the phase position of the carrier relative to the two sidebands has no influence on the quality of the reception, which would manifest itself in a very disturbing manner as selective fading in the conventional double-side-band receivers. Separating the two sidebands from one another is effected in the third low-pass filter connected behind the adder (subtractor) unit. If very low frequencies, for example, 100 Hz or lower, must be transmitted in the two sidebands, the frequency gap between these two sidebands is then 200 Hz or less. This frequency gap also exists at the output of the adder (subtractor) circuit: however, as a result of the mixing of the double-sideband signal with the radio frequency and the low frequency oscillation it is moved to the low frequency range. The third low-pass filter, which separates the two sidebands, must consequently satisfy very stringent requirements: It must have a passband corresponding to the bandwidth of the useful signal to be transmitted (some kHz) and the transition between the passband and the cutoff range should only be 100 Hz (or less). An elaboration of the invention therefore provides that this low-pass filter is constituted by a gyrator filter.

Also the other low-pass filters can be advantageously implemented as gyrator filters. For the first and second filters which follow the first radio frequency mixers, there is the additional condition that they must be fully identical as regards amplitude and also phase response. The phase of the oscillation presented to said filters by the two mixers is shifted in one branch 90° relative to the other branch and this phase shift must be maintained in the filters over the entire frequency range.

Controlled amplifiers must also be built-in in practice which must satisfy, as far as they are included in the two parallel branches, high requirements as regards equality of control behaviour. The required amplitude control voltage (AGC) is obtained by means of a low-pass filter of a very low cut-off frequency and a self-regulating control voltage amplifier. Any remaining amplitude errors in the two branches can then be compensated for by differential gain control in said two branches.

Figure 1A:
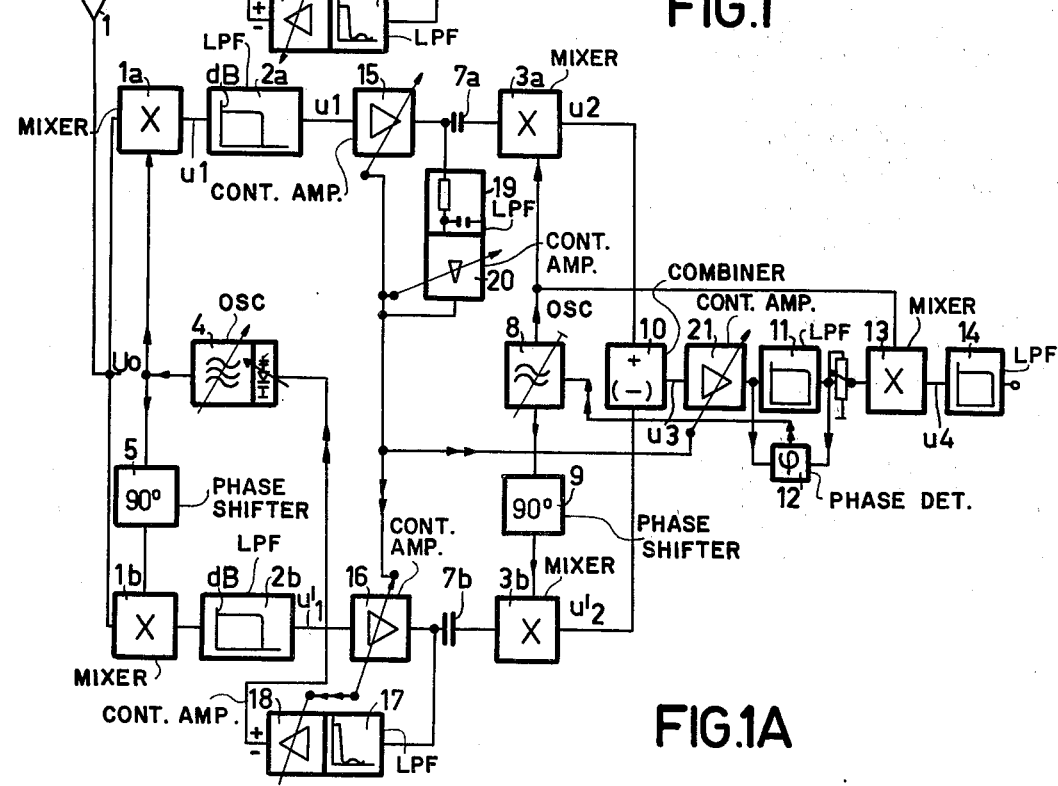

The invention will now be explained in greater detail with reference to an embodiment shown in the drawing. Herein shows FIG. 1 a block diagram of a circuit arrangement according to the invention while FIG. 1a shows a modification of FIG. 1; and FIGS. 2a to 2g show the frequency spectra in various points of the circuit arrangement according to the invention.

Figure 2A:
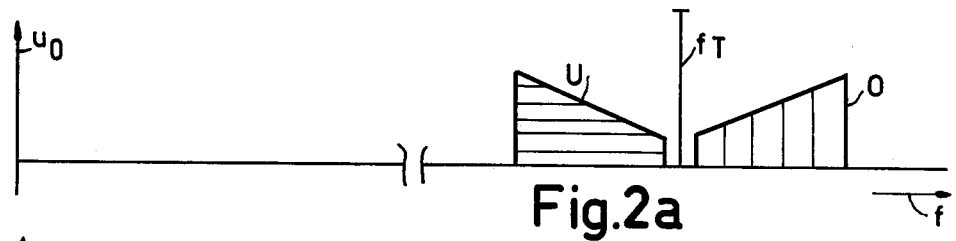

The double-sideband signal $u_O$ received from the antenna 1 is applied,—for example via broadband amplifiers, control amplifiers, attenuators, input circuits etc, which are not shown in the drawing—with equal phase to two identically constructed parallel branches A and B. FIG. 2a shows the frequency spectrum of the signal $u_O$. The signal contains a carrier of the carrier frequency $f_T$ and the two sidebands U and O, which are arranged symmetrically at the carrier.

Each of the two branches comprises a first mixing stage 1a or 1b, a low-pass filter 2a or 2b and a further second mixing stage 3a or 3b. In the mixing stage 1a or 1b the input signal $u_O$ is mixed with a radio frequency oscillation supplied by a tunable oscillator 4, which oscillation is applied directly to the mixing stage 1a and via a phase shifting member 5, which shifts the locally produced oscillation over exactly 90° to the mixing stage 1b. Preferably the mixing stages 1a or 1b are formed as full-wave multipliers supplying an output signal which is proportional to the product of the two input signals. In this ways it is achieved that the output signals comprise only sideband information whose frequencies deviate from the receiver carrier frequency.

It is important that the frequency of the oscillation supplied by oscillator 4 conforms as exactly as possible to the carrier frequency $f_T$ of the double-side-band signal $u_O$. To this end a phase or frequency control circuit—indicated by the block 17, 18—is provided by means of which the frequency of the locally produced oscillation 4 is synchronized on the carrier frequency $f_T$. To control the phase or frequency, the small positive or negative D.C. voltage which is produced in branch B in the case of phase errors, can be used. This voltage is applied via a low-pass filter 17 and the controlled amplifier 18 to the oscillator 4 and which readjusts the tuning of the oscillator, so that the phase of the locally produced oscillation corresponds, except for a small residual error, to the portion of the carrier frequency comprised in the input signal $u_O$.

Whilst the positive or negative D.C. voltage occuring in branch B is proportional to the residual-phase angle $\pm \Delta \phi$, the D.C. voltage component in branch A is proportional to the instantaneous amplitude of the received carrier voltage, and, after having been filtered by the low-pass filter 19 and gain-controlled in the controlled D.C. voltage amplifier 20, can be used for amplitude control (AGC).

The D.C. voltage components are then removed by the capacitors 7a and 7b before the second mixers 3a and 3b.

It is evident that all known measures for linearizing, such as RF-feedback, high-current transistors, balanced circuits etc. may be used for the mixers 1a and 1b to avoid cross modulation. Furthermore, by the mixing process of the input signals with the local high frequency oscillations the upper and lower sidebands of the received signal are so transposed to the lower frequency range that the two sidebands are superimposed, one sideband becoming, as it were, meshed on the other.

However, by mixing the signals with the two oscillator voltages whose phases are shifted over 90° relative to one another, it is achieved that the signals in branch B have shifted over +90° for the upper band signal O and over −90° for the lower band signal U, whereas in branch A the signals are not shifted and have a 0° phase shift. The signals $u_1$ in branch A are therefore shifted over 90° relative to those in branch B.

Figure 2B:
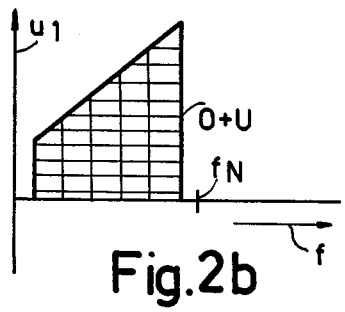
Figure 2C:
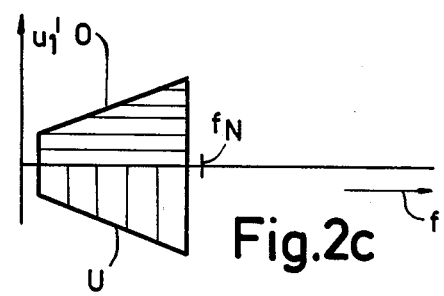

In the FIGS. 2b and 2c, which show the signals $u_1$ and $u_1'$ respectively at the output of the low-pass filters 2a and 2b respectively, this situation is illustrated in that in FIG. 2c the frequency spectrum originating from the lower sideband u is plotted with a negative sign, whereas in FIG. 2b the frequency spectrum originating from both sidebands is indicated with a positive sign.

If, after multiplication in the first mixer, the sideband oscillations O and U in branch A are cosine functions, then the sideband oscillations produces in branch B are a sine and a minus-sine function.

This is important for the mixing processes in the second mixers, wherein a further 90° —shift is effected, so that 180° is obtained. The low-pass filters 2a and 2b respectively have for their object to remove the mixing product at or about twice the carrier frequency, produced at the output of the mixing stages 1a and 1b. This filter furthermore serves for suppressing the mixing product produced by mixing the locally produced oscillation with the signal of a transmitter which is adjacent as regards frequency. If the frequency spacing of the carrier of two frequency-adjacent transmitters is, for example, 9 kH$_T$—as prescribed in the plans of the CCIR—the cutoff frequency of the low-pass filter 2a or 2b must be half this spacing in the assumed example, consequently 4.5 kHz or less, so that the mixing products originating from adjacent transmitters are suppressed. The low-pass filters 2a or 2b are consequently used for channel or transmitter separation and they, consequently, have the same function as the intermediate frequency filter in a conventional superheterodyne receiver.

At the reception of double-sideband transmissions in which each sideband contains exactly the same information, the signal $u_1$ at the output of the low-pass filter 2a may already represent the low-frequency useful signal; however, the selective fading already indicated in the preamble, might be produced when the received carrier is not accurately symmetrical to the two sidebands or when the locally produced oscillation continuously changes its phase position relative to the carrier comprised in the input signal. The effects of the selective fading could only be removed by the subsequent portion of the circuit.

The output signal of each of the low-pass filters 2a and 2b respectively are supplied via a controlled amplifier 15 and 16 respectively to either of a further multiplicative mixing stage 3a and 3b respectively, in which it is mixed with the low-frequency oscillation produced by an oscillator 8, which oscillation is supplied directly to a mixing stage 3a and to the other mixing stage 3b through a phase shifting member 9, which shifts the phase of the locally produced oscillation over exactly 90°. The low-frequency oscillation supplied by oscillator 8 must have a frequency $f_N$, which is equal to or only slightly larger than, the upper frequency of the useful low-frequency signal to be transmitted; it must not be chosen too high, as the requirements on the low-pass filter separating the upper from the lower sideband and which will be explained in greater detail hereinbelow, are the greater according as the frequency of the locally produced oscillation is higher. If the frequency spacing between the carriers of two adjacent transmitters is, for example, 9 kHz, a value of 4.5 kHz is then preferably chosen in the frequency $f_N$ of oscillator 8.

Figure 2D:
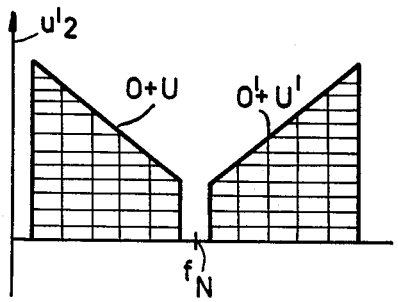
Figure 2E:
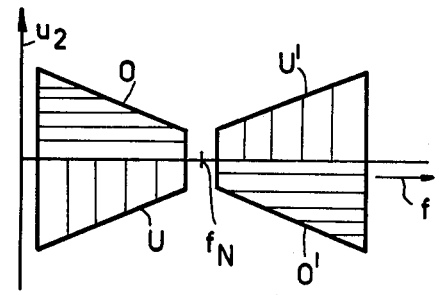

The—preferably multiplicative—mixing stages fold the frequency spectra in accordance with FIG. 2b and 2c respectively symmetrically on frequency $f_N$ of the added locally produced oscillation so that, for example, from the frequency band O+U (FIG. 2b), the frequency bands O+U and O'+U' are produced (cf. FIG. 2d), and from the frequency bands O and U (FIG. 2c), the frequency bands O, U and O', U' (FIG. 2e). Those frequency components in the two sidebands which correspond to the low useful frequencies have a smaller frequency spacing from the frequency $f_N$ than the components which correspond to the higher useful frequencies. The second mixing operation with the two oscillations, which are shifted 90° relative to one another, of the oscillator 8, furthermore accomplishes that the upper sideband O appears in the lower frequency band (frequencies $<f_N$) in the same phase position at the two outputs of the mixers 3a and 3b respectively, whereas the lower sideband U appears in the lower frequency band with the opposite phase at the two outputs of the mixer stages 3a and 3b (cf. FIG. 2d and 2e).

(The reverse situation is obtained if the phase shifting member 9 is not arranged between the oscillator 8 and the mixing stage 3b, but between the oscillator 8 and the mixing stage 3a). In the upper frequency band (i.e. for frequencies $>f_N$) the lower sideband U' is present, on the contrary, at the two outputs of the mixer stages in the same phase position, whereas the upper sideband O' is in the opposite phase position. This situation is also shown in FIG. 2d and FIG. 2e.

Figure 2F:
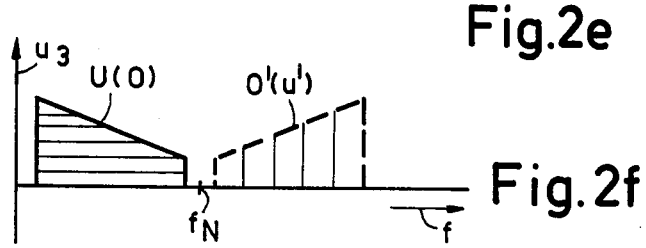
Figure 2G:
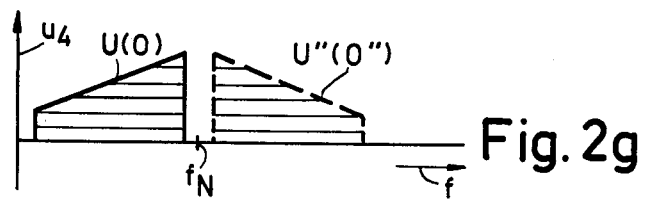

The different phase positions of the sidebands U and O in the lower frequency band can be used for suppressing one of the sidebands. To this end an adder (subtractor) circuit 10 is provided to whose inputs the output signals $u_2$ and $u_2'$ of the two mixing stages 3a and 3b are supplied and which is preferably so constructed that the two signals may optionally either be added to or be substracted from one another, so that either the lower or the upper sideband is suppressed in the lower frequency band. In the upper frequency band the other sideband is then suppressed. FIG. 2f shows the output signal $u_3$ of the circuit 10 after adding (subtracting). This output signal is applied to a low-pass filter 11, which suppresses all frequencies above the oscillator frequency $f_N$, as illustrated by the dashed representation of the upper frequency band. Consequently, only the original upper or the lower sideband—depending on whether the output signals of the mixing stages 3a and 3b are added or subtracted in the circuit 10, remains at the output of the low-pass filter. Unfortunately, the low frequency information is in the inverted frequency position so that a further mixing operation is required in mixer 13 for obtaining the correct position.

The above explanations will make it clear that the suppression of one sideband depends on as accurate as possible a compensation in the circuit 10 of the two components of the output signals of the mixer stages 3a and 3b corresponding to this sideband and on that the upper frequency band is suppressed as far as possible by the low-pas filter 11.

It is a requirement for the accurate compensation of either of the two sidebands that the two branches comprising the elements 1a, 2a, 3a, 15, 7a and respectively 1b, 2b, 3b, 16, 7b are as identical as possible. The best possible way to achieve this is by combining corresponding components in an integrated circuit.

To obtain a suppression of the upper frequency band which is as accurate as possible the low-pass filter 11 is preferably a gyrator—low-pass filter, which is constructed so, that its first pole position is substantially equal to the frequency of the oscillator 8. To this end a control circuit can be formed, comprising a phase comparison circuit 12 producing a signal which depends on the phase difference between the voltages at the input and the output of the low-pass filter 11, which signal is utilized for adjustment. Use is made of the fact that in the vicinity of the pole position of the attenuating filter this phase difference is highly dependent on the frequency. Instead of controlling the pole position of the low pass filter 11, it is also possible to control the frequency of the oscillator 8 by means of the phase comparison circuit 12. This is indicated in FIG. 1a.

The output signal of the low-pass filter 11 comprises the upper or the lower sideband in the inverted frequency position (inverted LF-band), that is to say the higher frequency components of the sideband correspond to lower useful frequencies and the lower frequencies in the sideband correspond to higher useful frequencies. To bring the given sideband in the correct receiving position, a last mixing stage 13 is provided in which the output signal of the low-pass filter is mixed with the signal produced by oscillator 8. Last mentioned stage 13 must be—like the mixing stages 3a and 3b—a multiplicative mixing stage, for example a product detector, so that its output signal contains only the sum and difference frequencies formed from its two input signals (cf. FIG. 2g). The sum frequencies then produced, which represent the given sideband U" or O" in the inverted position, are removed by means of a low-pass filter 14, whose cutoff frequency also corresponds to the frequency $f_N$ of oscillator 8. The output signal of last-mentioned low-pass filter represents the useful low-frequency signal.

As mentioned above, the effects of the selective fading are avoided in the circuit arrangement according to the invention by using one of the two sidebands U or O for reception. The adder (subtractor) circuit 10 can then be selected to operate in the mode (adding or subtracting) in which the less disturbed sideband is received. As only one sideband is used for reception, two sidebands which are independent from one another can also be received with this circuit arrangement.

As the frequency of oscillator 4 corresponds with exactly the same phase to the carrier frequency, it is impossible that, owing to the radiation of this frequency, interferences are produced, neither in the receiver comprising the circuit according to the invention, nor in the receivers. A remainder of the frequency $f_N$ which may still be present in the output signal of the mixing stage 13 can be suppressed without further measures by the low-pass filter 14. Coils are not required in the overall receiver so that the circuit can be implemented without further measures in integrated circuit technology. It is not required then to combine all the modules in one single integrated circuit, but it is important that modules which must have the same characteristic, for example the mixing stages 3a and 3b, are integrated on one and the same semiconductor substrate. In principle, it is alternatively possible to receive double sideband signals without carrier with the circuit according to the invention. In this case, however, a PLL-circuit cannot be used and the frequency of the oscillator 4 must very accurately correspond to the frequency of the suppressed carrier. In the most simple case the usual variably tuned input selectivity can be fully dispensed with, or it is possible to use input band filters which are fixedly adjusted to the receiving band.

What is claimed is:

1. A circuit arrangement for receiving one of the sidebands of a double sideband signal, comprising two first mixing stages means for mixing the double sideband signal with each one of two locally produced radio frequency oscillations having the same frequency as the carrier frequency of said double sideband signal and phases shifted 90° relative to one another, first and second low pass filter means for filtering the output signals of the two mixing stages respectively, two second mixing stages means respectively coupled to said filters for mixing the filter output signals with either one of two locally produced low-frequency oscillations having the same frequency which is at least equal to the upper frequency of the baseband signal and shifted in phase 90° relative to one another, means for combining the output signals of the two second mixing stages, a third low-pass filter means coupled to said combining means for suppressing signals having a frequency above the frequency of the local low frequency oscillation, and a last mixing stage means for mixing the output signals of the third low-pass filter with one of the local low frequency oscillations.

2. A circuit arrangement as claimed in claim 1, further comprising a fourth low-pass filter coupled to said last mixing stage and having a cutoff frequency which corresponds to that of the third low-pass filter.

3. A circuit arrangement as claimed in claim 1 for receiving one from a plurality of double sideband signals whose carrier frequencies are equally spaced, wherein the frequency of the locally produced low-frequency oscillations corresponds to half the frequency spacing of two adjacent carrier frequencies.

4. A circuit arrangement as claimed in claim 1 for receiving double-sideband signals with carriers, further comprising a tunable oscillator circuit means for supplying the radio frequency oscillations, and phase control circuit means for providing that the oscillator frequency is synchronized with the received carrier frequency.

5. A circuit arrangement as claimed in claim 4, wherein the phase control circuit means comprises an input means for receiving a D.C. voltage produced by the mixing stage whose input is supplied with the locally produced radio frequency oscillation with a phase shift of approximately 90° relative to the carrier oscillation.

6. A circuit arrangement as claimed in claim 1, further comprising means for using as a gain control voltage a D.C. voltage produced by the mixing stage whose input is supplied with the locally produced radio frequency oscillation having the same phase as the carrier oscillation.

7. A circuit arrangement as claimed in claim 1, wherein the third low-pass filter comprises a gyrator filter.

8. A circuit arrangement as claimed in claim 1, wherein the first and second low-pass filters comprise gyrator filters.

9. A circuit arrangement as claimed in claim 2, wherein the fourth low-pass filter comprises a gyrator filter.

10. A circuit arrangement as claimed in claim 1, further comprising a control circuit means for adjusting the oscillator for locally producing the low frequency oscillation.

11. A circuit arrangement as claimed in claim 1, wherein the combining means comprises means for providing that the output signals of the second mixing stages can optionally be added or subtracted from one another.

12. A circuit arrangement as claimed in claim 1, further comprising D.C. blocking capacitors coupled to the outputs of the first mixing stages respectively.

13. A circuit as claimed in claim 1, further comprising a control circuit means for adjusting the first attenuation pole of the third low pass filter.

* * * * *